United States Patent [19]
Kaneda

[11] Patent Number: 5,285,872
[45] Date of Patent: Feb. 15, 1994

[54] HYDRAULIC RETARDER HAVING A FLUID FILLED CASING WITH A ROTOR OPERATING CLUTCH DISPOSED THEREIN

[75] Inventor: Naoki Kaneda, Saitama, Japan

[73] Assignee: Akebono Brake Industry Co., Ltd., Tokyo, Japan

[21] Appl. No.: 840,790

[22] Filed: Feb. 26, 1992

[30] Foreign Application Priority Data

Mar. 25, 1991 [JP] Japan .................. 3-082965

[51] Int. Cl.$^5$ .................. B60T 1/08; F16D 57/02
[52] U.S. Cl. .................. 188/71.5; 188/71.6; 188/296; 192/3.29; 192/12 A
[58] Field of Search .......... 188/296, 291, 294, 292, 188/293, 264 F, 264 CC, 264 D, 264 B, 71.5, 71.6; 464/27, 58; 192/3.21, 3.23, 3.33, 3.32, 76, 12, 12 BA, 12 B, 12 A, 113 B

[56] References Cited

U.S. PATENT DOCUMENTS

| | | | |
|---|---|---|---|
| 2,045,615 | 6/1936 | Rosle et al. | 192/3.29 |
| 2,226,801 | 12/1940 | Black | 192/12 A |
| 2,442,840 | 6/1948 | Carnagua | 192/3.29 |
| 2,707,887 | 5/1955 | Slack | 192/3.33 |
| 2,828,840 | 4/1958 | Kelley et al. | 188/71.6 |
| 2,865,483 | 12/1958 | Livezey | 192/3.29 |
| 3,132,530 | 5/1964 | Le Brise | 192/3.33 |
| 3,259,218 | 7/1966 | Black et al. | 192/3.29 |
| 4,066,157 | 1/1978 | Gibbs | 192/12 A |
| 4,274,520 | 6/1981 | Van der Hardt Aberson | 192/3.32 |
| 5,121,821 | 6/1992 | Poorman et al. | 192/3.29 |

FOREIGN PATENT DOCUMENTS

| | | |
|---|---|---|
| 1040819 | 9/1966 | United Kingdom . |
| 1316404 | 5/1973 | United Kingdom . |
| 2056017 | 3/1981 | United Kingdom . |
| 2097895 | 11/1982 | United Kingdom . |

Primary Examiner—Matthew C. Graham
Attorney, Agent, or Firm—Finnegan, Henderson, Farabow, Garrett & Dunner

[57] ABSTRACT

A hydraulic retarder including a rotor vane fixable to a rotational shaft rotating with vehicle wheels to relatively be unrotatable with respect thereto, a stator vane substantially unrotatable with respect to the vehicle body, and a clutch apparatus for engaging the rotational shaft with and disengaging same from the rotor vane. The clutch apparatus is provided with a plurality of clutch plates which are engaged with the rotational shaft to be axially slidable and alternately provided among a plurality of pressure plates. The rotor vanes, stator vanes and clutch apparatus is accommodated in a casing secured to the vehicle body parts within which an operation fluid is filled. The hydraulic retarder of the invention further includes plungers disposed spaced apart from one another and penetrating through the casing with fluid sealingly and located at an end of the support member. A drive apparatus disposed outside the casing for actuating the clutch apparatus by depressing the plunger into the casing.

16 Claims, 3 Drawing Sheets

HYDRAULIC RETARDER HAVING A FLUID FILLED CASING WITH A ROTOR OPERATING CLUTCH DISPOSED THEREIN

BACKGROUND OF THE INVENTION

1. Field of the Invention

The present invention relates to a hydraulic retarder compact in size and capable of reducing the number of rotating parts provided between an operation fluid filled within a casing of the retarder and atmosphere outside the casing.

2. Related Art

There has been known a conventional hydraulic retarder for large-sized vehicles such as buses, trucks, etc. The conventional hydraulic retarder of this type produces a braking torque when, for example, the vehicle goes down a sloping road or the vehicle running at high speed is to decelerate abruptly, to thereby suppress an undesired fade phenomenon and, therefore, improve a safety and durability of friction materials of the bake.

One example of the conventional hydraulic retarder is as disclosed in commonly assigned U.S. Pat. No. 4,828,079. According to the hydraulic retarder described in this patent, a clutch apparatus is disposed outside a casing of the hydraulic retarder and a cylinder apparatus for driving the clutch apparatus to engage/-disengage is also disposed outside the casing. The hydraulic retarder of this type is provided with rotatable rotor vanes secured to a rotating shaft such as a propeller shaft rotating with vehicle wheels, and unrotatable stator vanes secured to a vehicle body. When the rotor vanes are engaged with the rotational shaft by an operation of the clutch apparatus, the retarder produces a braking torque by a speed energy of an operation fluid flowing between the stator vanes and rotor vanes. The operation fluid is always filled within the retarder casing accommodating therein the stator vanes and rotor vanes.

The conventional hydraulic retarder as described above saves internal space of the casing for accommodating the vanes since the clutch apparatus is disposed outside the casing. However, the cooling effect of the operation fluid is not applied to the clutch apparatus. Further, the hydraulic retarder of this type may readily suffer from a problem in occurring a leakage of the operation fluid because the retarder has many rotating or sliding parts or portions connecting between the operation fluid filled within the casing and atmosphere outside the casing.

SUMMARY OF THE INVENTION

Therefore, the present invention was made in view of the difficulties accompanying the conventional hydraulic retarder.

An object of the invention is to provide a hydraulic retarder in which a clutch apparatus is cooled down by operation fluid.

Another object of the invention is to provide hydraulic retarder capable of reducing an internal space of a casing accommodating a stator and rotor vanes.

Still another object of the invention is to provide hydraulic retarder capable of obtaining a braking torque stably.

Moreover, an object of the invention is to provide hydraulic retarder capable of suppressing a possibility of leakage of operation fluid.

Still more another object of the invention is to provide a hydraulic retarder by which a maintenance and investigation of a drive apparatus for driving a clutch apparatus is very easy.

The above and other objects of the present invention can be achieved by a provision of a hydraulic retarder which, according to the present invention, includes a rotor vane fixable to a rotational shaft rotating with vehicle wheels to relatively be unrotatable with respect thereto, a stator vane substantially unrotatable with respect to the vehicle body, and a clutch apparatus for engaging the rotational shaft with and disengaging same from the rotor vane. The clutch apparatus is provided with a plurality of clutch plates which are engaged with the rotational shaft to be axially slidable and alternately provided among a plurality of pressure plates. The rotor vanes, stator vanes and clutch apparatus is accommodated in a casing secured to the vehicle body parts within which an operation fluid is filled. The hydraulic retarder of the invention further includes plungers disposed spaced apart from one another and penetrating through the casing with fluid sealingly and located at an end of a support member. A drive apparatus disposed outside the casing for actuating the clutch apparatus by depressing the plunger into the casing.

The hydraulic retarder of the invention is further provided with a first bearing having an inner ring and an outer ring one of which is fitted to the support member and a second bearing having an inner and outer rings one of which is fitted to a pressure plate positioned at the end of the support member and the other one is engaged with an inner end portion of the plunger.

According to the hydraulic retarder of the invention, the braking torque is obtained by actuating the drive apparatus for operating the clutch apparatus during the vehicle running. That is, by an operation of the drive apparatus, the plunger is urged into the casing and the clutch plates come into abutment against the respective pressure plates and thus the clutch apparatus is actuated, so that the rotor vanes start to rotate through the clutch plate, pressure plate and the support member. In case of having a first bearing, the support member is rotatably supported by the first bearing. On the other hand, in case of having a second bearing, the pressure plates are depressed through the second bearing. As a result, the hydraulic retarder becomes effective and, therefore, the speed energy of the operation fluid generated by the rotation of the rotor vanes is absorbed by the stator vanes. Thus, the hydraulic retarder according to the present invention operates merely by depressing the plunger into the casing.

While the operation fluid acting also as a coolant circulates within the retarder chamber by a self-pumping operation of the rotor vanes or another pump separately provided, the rotational energy of the rotor vanes is effectively absorbed by the stator vanes. That is, the rotational energy as a heat is transferred to the stator vanes and, then, the vehicle decelerates effectively. In this operation, the clutch apparatus is sufficiently cooled down owing to the operation fluid. Further, since the drive apparatus is disposed outside the casing, the hydraulic retarder of the invention does not suffer from a problem in leaking the operational fluid or pressurized air.

When the hydraulic retarder is to stop its operation, the drive operation of the drive apparatus is released to return the plunger to its original position. In case of having a second bearing, the plunger and the second bearing are returned to their original position by the release of the drive apparatus. As a result, the speed energy of the operation fluid stops to be applied to the stator vanes and the hydraulic retarder stops its operation.

DESCRIPTION OF THE PREFERRED EMBODIMENT

A preferred embodiment of the present invention will now be described with reference to accompanying drawings.

Figure 1:
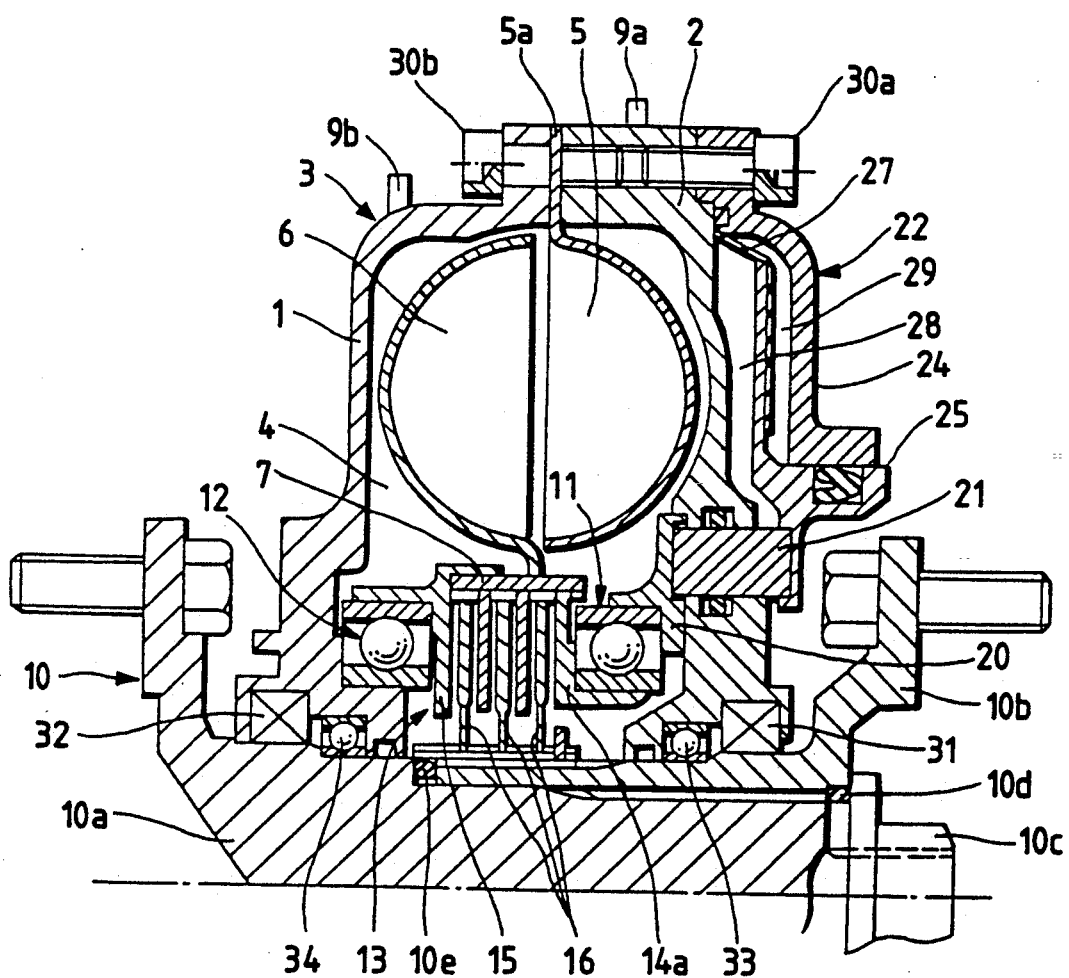
FIG. 1 is a cross sectional view showing an upper half of the hydraulic retarder according to the preferred embodiment of the invention.

FIGS. 1 to 4 show one embodiment according to the present invention. A hydraulic retarder of the invention is provided with a casing 3 constituted by a rotor vane casing 1 and a stator vane casing 2. The rotor vane casing 1 and the stator vane casing 2 are fixedly secured to be one unit by a plurality of bolts 30a, 30b having a hexagonal groove through a flange part 5a of a stator vane 5 described later and a sealing member not shown in the figures. The casing 3 is fixed to stationary members of a vehicle body such as a rear cover of a transmission apparatus not shown in the figures and, therefore, not rotatable. A rotational shaft 10 such as an output shaft of the transmission apparatus passes through the center portion of the rotor vane casing 1 and the stator vane casing 2 through two pairs of sealing members 31, 32 and bearings 33, 34, so that the rotational shaft 10 is rotatable and liquid sealable with the hydraulic retarder. The rotational shaft 10 engages with vehicle wheels via a propeller shaft not shown and, accordingly, rotates with the vehicle wheels. The rotational shaft 10 is provided with a main rotational shaft 10a and a sub-rotational shaft 10b which are engaged with each other by a serration and further secured to each other by nuts 10c. Sealing members 10d and 10e are disposed between the main rotational shaft 10a and the sub-rotational shaft 10b as shown in FIG. 1.

The casing 3 disposed at a periphery of the rotational shaft 10 through the sealing members 31, 32 defines a retarder chamber 4 within which the operation fluid such as oil or water is always filled. A stator vane 5 and a rotor vane 6 both having a fan extending radially from the rotational shaft 10 are provided within the retarder chamber 4 at inside the stator vane casing 2 side and rotor vane casing 1 side, respectively. The rotor vane 6 is fixable to the member of the rotational shaft 10 side to relatively be unrotatable with respect thereto. The stator vane 5 is unitary connected to the casing 3 by a flange 5a thereof so that the vane 5 is substantially unrotatable with respect to the vehicle body.

Figure 2:
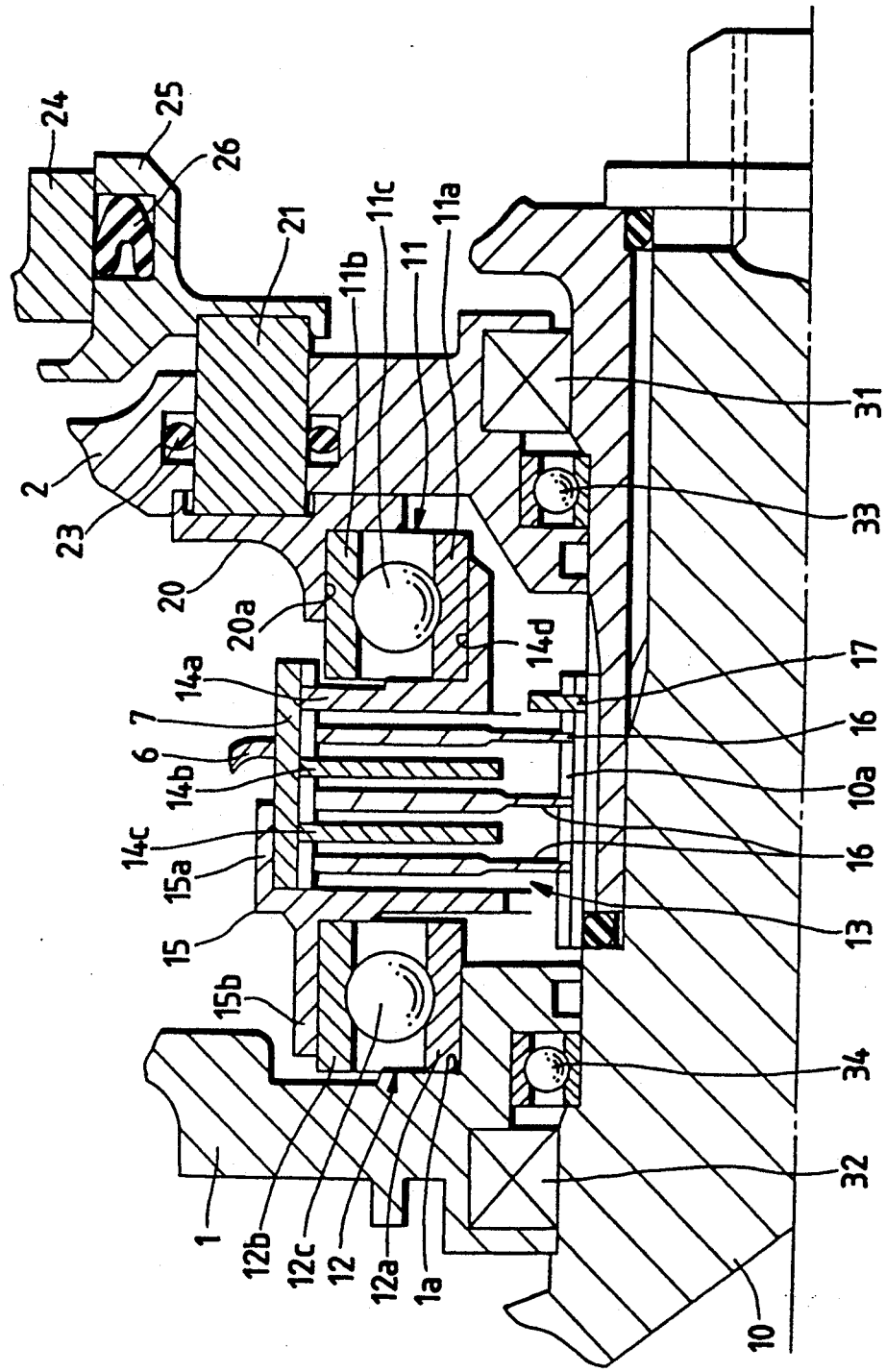
FIG. 2 is an enlarged cross sectional view of a clutch apparatus according to the embodiment shown in FIG. 1.
Figure 3:
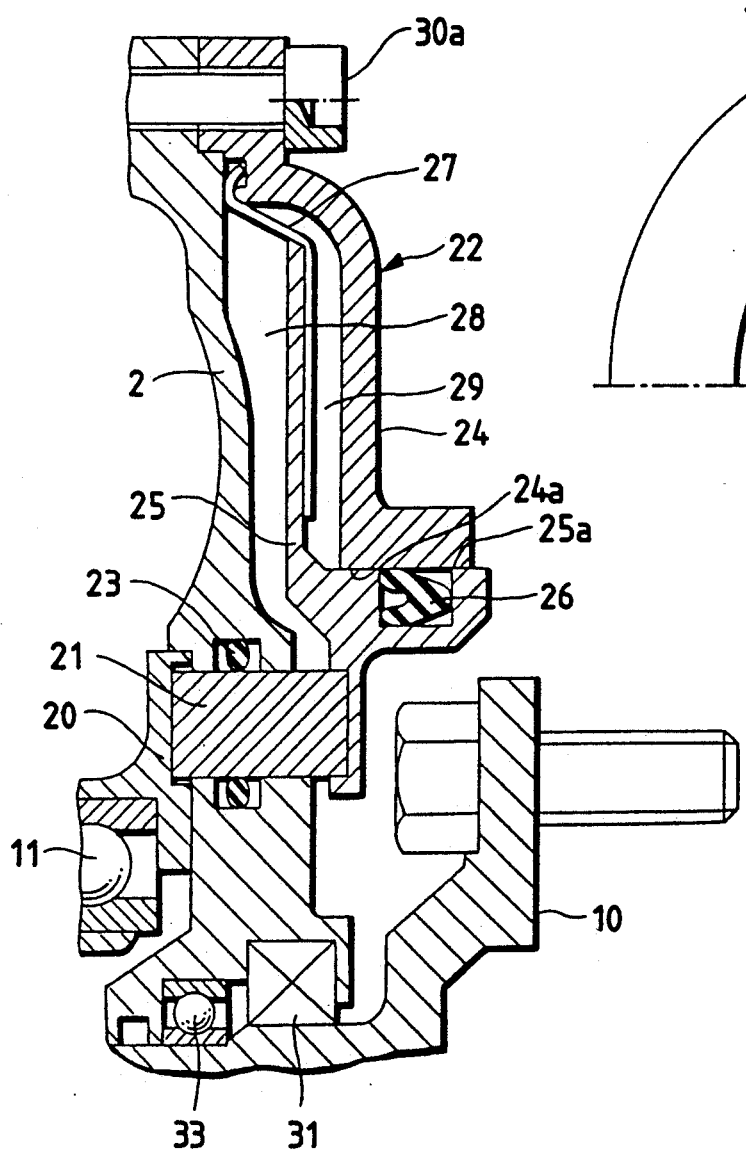
FIG. 3 is an enlarged cross sectional view of a drive apparatus according to the embodiment.
Figure 4:
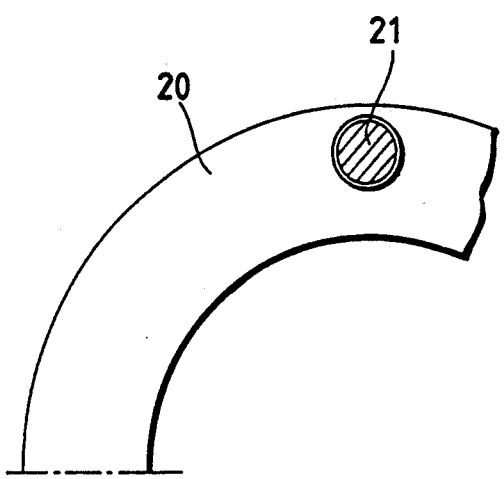
FIG. 4 is an essential view of the support member of the embodiment.

An operation fluid supply port 9a is formed on the stator vane casing 2 positioned above the retarder chamber 4 while an operation fluid discharge port 9b is formed on the rotor vane casing 1 above the retarder chamber 4. As shown in FIG. 2, a cylindrical support member 7 slidably supports a plurality of annular pressure plates 14a, 14b and 14c splinedly engaged with the support member 7. The support member 7 is rotatably supported by the casing 3 through a first bearing 12 and second bearing 11. That is, the first bearing 12 is provided with an inner ring 12a, an outer ring 12b, and a ball 12c. The inner ring 12a is press fitted on an annular step surface 1a of the rotor vane casing 1 and supports the ball 12c with the outer ring 12b. The second bearing 11 is provided with an inner ring 11a, an outer ring 11b and a ball 11c. The inner ring 11a of the second bearing 11 is press fitted on an annular step surface 14d of the axially slidable pressure plate 14a. An axial end of the support member 7 is press fitted in a first cylindrical portion 15a of a stationary pressure plate 15. On the other hand, the outer ring 12b of the first bearing 12 is press fitted in a second cylindrical portion 15b of the pressure plate 15.

The outer ring 11b of the second bearing 11 is press fitted in an annular step surface 20a of an annular connecting member 20. A plunger described later in detail is press fitted in an outer peripheral portion of the connecting member 20. Thus, one end of the support member 7 is rotatably and positively supported by the rotor vane casing 1 through the pressure plate 15 and the first bearing 12, whereas the other end of the member 7 is rotatably supported by the stator vane casing 2 through the slidable pressure plate 14a, second bearing 11, connecting member 20 and plunger 21.

A plurality of clutch plates 16 are splinedly engaged with the main rotational shaft 10a of the shaft 10 to be axially slidable and alternately provided among the pressure plates 14a, 14b, 14c and 15. A stopper ring 17 inhibits the further movement of the clutch plate 16. The support member 7, pressure plates 14a, 14b, 14c and 15, and the clutch plates 16 and other parts constitute a clutch apparatus 13 which operates to engage and disengage the rotational shaft 10 with and from the rotor vanes 6, respectively.

The clutch apparatus 13 is actuated by urging the pressure plates 14a, 14b, 14c and 15 against the clutch plates 16 rotating together with the rotational shaft 10, to thereby rotate the cylindrical support member 7 rotatably supported on the stationary casing 3 through the first and second bearings 12 and 11 which causes the rotor vanes 6 unitary connected to the support member 7 to rotate with the rotational shaft 10.

A plunger 21 and drive apparatus 22 for operating the clutch apparatus 13 will now be described.

Plurality of plungers 21 are disposed spaced apart from one another on the circumferential direction of the casing 3 and penetrates through the casing 3 so as to be slidably and fluid sealably therewith. An inner end portion of the plungers 21 connects to the outer ring 11b of the second bearing 11 through the connecting member 20. A seal ring 23 is fitted between the plunger 21 and the stator vane casing 2 for assuring the fluid sealing between these members. More than two plungers 21 are disposed on the annular connecting member 20 along the circumferential direction thereof as apparent from FIG. 4.

The drive apparatus 22 is provided with a cover 24 and a piston member 25 mounted between the stator vane casing 2 and the cover 24. The cover 24 is disposed outside the casing 3, that is, the stator vane casing 2 and unitary secured to the stator vane casing 2 by a bolt 30a for covering the outer peripheral portion of the stator vane casing 2. An inner peripheral part of the piston member 25 is press fitted on an outer end portion of the plunger 21, so that an annular step surface 25a extending cylindrically is slidably fitted on an annular inner surface 24a of the cover 24 through a seal member 26. An outer peripheral portion of the piston member 25 adheres onto an inner peripheral portion of a diaphragm 27 having sealability and flexibility. An outer peripheral portion of the diaphragm 27 is sandwiched between the stator vane casing 2 and the cover 24, to thereby define an inner chamber 28 and an outer chamber 29 divided by the piston member 25 and diaphragm 27 between the stator vane casing 2 and the cover 24. The inner chamber 28 and outer chamber 29 each connect to a pressurized air supply source via a switching valve which are not shown in the figures, so that one of the inner chamber 28 and outer chamber 29 is supplied with the pressurized air whereas the other is drained by operating the switching valve.

The operation of the hydraulic retarder according to the preferred embodiment of the invention as disclosed above will now be described.

While the vehicle is running, when a retarder switch (not shown) is actuated to drive the drive apparatus 22 the clutch apparatus 13 is then actuated. That is, a pressurized air is supplied into the outer chamber 29 while the inner chamber 28 is drained, so that the piston member 25 slide leftwardly of FIG. 1 thereby depress the plunger 21 and the support member 20 into the casing 3. By this operation, the diaphragm is deformed. Since the pressure plate 14a is also depressed into the casing through the second bearing 11, the clutch plates 16 come into abutment against the respective pressure plates 14a, 14b, 14c and 15 and thus the clutch apparatus 13 is actuated, so that the rotor vanes 6 start to rotate through the clutch plates 16, pressure plates 14a, 14b, 14c and 15 and the support member 7. As a result, the hydraulic retarder becomes effective and, therefore, the speed energy of the operation fluid generated by the rotation of the rotor vanes 6 is absorbed by the stator vanes 5. Thus, the hydraulic retarder according to the present invention operates merely by depressing the plunger 21 into the casing 3.

While the operation fluid acting also as a coolant circulates within the retarder chamber 4 by a self-pumping operation of the rotor vanes 6 or another pump separately provided, the rotational energy of the rotor vanes 6 is effectively absorbed by the stator vanes 5. That is, the rotational energy as a heat is transferred to the stator vanes 5 and, then, the vehicle decelerates effectively. In this operation, the clutch apparatus 13 is sufficiently cooled down owing to the operation fluid. Further, since the drive apparatus is disposed outside the casing 3, the hydraulic retarder of the invention does not suffer from a problem in leaking the operational fluid or pressurized air.

The actuation of the hydraulic retarder is stopped by changing the retarder switch to OFF state to thereby draining the pressurized air within the outer chamber 29 while supplying the pressurized air into the inner chamber 28. In this operation, the piston member 25, plunger 21, support member 20 and the second bearing 11 return to their original state to allow the clutch plates 16 of the clutch apparatus 13 to disengage from the respective pressure plates 14a, 14b, 14c and 15 so that the rotor vanes 6 stops rotating. As a result, the speed energy of the operation fluid stops to be applied to the stator vanes 5 and the hydraulic retarder stops its operation.

A compression spring may be disposed between the stator vane casing 2 and the piston member 25 to urge the piston member 25 toward its original position, and pressurized air is supplied into and discharge from merely the outer chamber 29 to engage/disengage the clutch apparatus 13. In this case, the inner chamber 28 is provided with an air port for communicating with atmosphere.

Although in the embodiment of the invention described above the inner ring 12a of the first bearing 12 is fixed to the casing 1 while the outer ring 12b is fixed to the pressure plate 15, the invention is not limited thereto or thereby. That is, since the important of the first bearing 12 is to support the support member 7 rotatably on the casing 3 the inner ring 12a may be fixed to the pressure plate 15 while the outer ring 12b is fixed to the rotor vane casing 1. Similarly, the inner ring 11a of the second bearing 11 may be fixed to the connecting member 20 while the outer ring 11b is fixed to the movable pressure plate 14a positioned at the end. Further, the connecting member 20 may be eliminated while the inner ring 11a or the outer ring 11a of the second bearing 11 is directly secured to the plunger 21.

As described above, the hydraulic retarder according to the present invention performs the following effects.

(1) Since the clutch apparatus is disposed within the casing of the retarder whereas the drive apparatus for driving the clutch apparatus is disposed outside the casing, the clutch apparatus is effectively cooled down by the operation fluid and, further, the internal space of the casing for accommodating the stator and rotor vanes can be saved.

(2) The clutch apparatus is actuated merely by depressing the plunger into the casing, the variation of the internal volume of the casing is small to thereby suppress the increase of pressure temporally generated at the initial operation time. Accordingly, a stable braking torque generated by the hydraulic retarder can be obtained.

(3) The number of rotating and/or sliding parts which require fluid sealability is reduced compared to the conventional retarder whereas the drive apparatus is disposed outside the casing, the possibility of leakage of operation fluid is effectively suppressed.

(4) Since the drive apparatus is disposed outside the Casing, the maintenance and investigation of the drive apparatus is readily compared to in case of a drive apparatus disposed within the casing.

What is claimed is:

1. A hydraulic retarder for a vehicle, comprising:
   a casing fixed to vehicle body members and unrotatable with respect thereto;
   an operational fluid filled within said casing;
   stator means disposed in and secured to said casing;
   rotor means disposed in said casing, said rotor means being rotatable with a rotational shaft of the vehicle;
   clutch means disposed in said casing for rotating said rotor means;
   plunger means slidably penetrating through said casing with fluid sealably; and
   drive means disposed outside said casing for engaging said clutch means through said plunger means;
   said drive means comprising;
   a cover disposed outside the casing and securing to said casing to cover the outer peripheral portion of said casing;
   a piston member mounted between said casing and said cover, an inner peripheral part of said piston member being press fitted on an outer end portion of said plunger, said piston member being slidably fitted on said cover through a seal member; and a diaphragm being sealably and flexibly adhered onto an outer peripheral portion of said piston member.

2. The hydraulic retarder of claim 1, wherein said stator means comprises a plurality of stator vanes having a fan extending radially from the rotational shaft, each of said stator vanes has a flange secured to said casing, and said rotor means comprises a plurality of rotor vanes having a fan extending radially from the rotational shaft and facing respective fan of said stator vanes, each of said rotor vanes has a flange.

3. The hydraulic retarder of claim 1, wherein said clutch means comprises:

a plurality of clutch plates connected to the rotational shaft of the vehicle and rotating therewith;

a plurality of pressure plates disposed alternately among said clutch plates, an end one of said pressure plates receiving a pressure of said plunger means; and a support member for supporting said pressure plates, said support member and said flange of said rotor vanes being formed as a unitary structure, said support member being rotatably supported on said casing.

4. The hydraulic retarder of claim 3, wherein said pressure plates and said support member of said clutch means rotate with respect to said casing with said the rotational shaft of the vehicle through a bearing means when said pressure plates are engaged with said clutch plates rotating with the rotational shaft.

5. The hydraulic retarder of claim 4, wherein said bearing means comprises a first bearing having an inner ring and an outer ring and second bearing having an inner ring and an outer ring.

6. The hydraulic retarder of claim 1, wherein said piston member divides the inside of said cover into an inner chamber and an outer chamber, said inner chamber and said outer chamber connect to a pressurized air supply source via a switching valve, and one of said inner chamber and said outer chamber being supplied with the pressurized air.

7. The hydraulic retarder of claim 6, wherein said outer chamber is supplied with the pressurized air and said inner chamber is drained by operating a switching valve.

8. The hydraulic retarder of claim 6, further comprising a compression spring disposed between said casing and said piston member for urging said piston member to its original position, and said outer chamber is supplied with the pressurized air and said inner chamber comprises an air hole communicating with the atmosphere.

9. The hydraulic retarder of claim 1, further comprising a connecting member disposed between said plunger means and said clutch means for transferring the depressing force of said plunger means to sad clutch means.

10. The hydraulic retarder of claim 1, wherein said casing comprises a stator vane casing and a rotor vane casing fixedly secured to said stator vane casing for defining a retarder chamber within which an operation fluid is filled and accommodating therein said stator means, said rotor means and said clutch means.

11. The hydraulic retarder of claim 1, wherein said plunger means comprises three plungers spaced apart from one another on the circumferential direction of said casing.

12. The hydraulic retarder of claim 1, further comprising a seal member disposed between said plunger means and said casing.

13. The hydraulic retarder of claim 1, wherein said operation fluid is an oil.

14. The hydraulic retarder of claim 1, wherein said operation fluid is water.

15. A hydraulic retarder for a vehicle, comprising:

a casing fixed to vehicle body members and unrotatable with respect thereto;

an operational fluid filled within said casing;

stator means disposed in and secured to said casing;

rotor means disposed in said casing, said rotor means being rotatable with a rotational shaft of the vehicle;

clutch means disposed is said casing for rotating said rotor means;

plunger means slidably penetrating through said casing with fluid sealably;

drive means disposed outside said casing for engaging said clutch means through said plunger means;

a plurality of clutch plates connected to the rotational shaft of the vehicle and rotating therewith;

a plurality of pressure plates disposed alternately among said clutch plates, an end one of said pressure plates receiving a pressure of said plunger means;

a support member for supporting said pressure plates, said support member and said flange of said rotor vanes being formed as a unitary structure, said support member being rotatably supported on said casing;

said pressure plates and support member of said clutch means rotating with respect to said casing with said rotational shaft of the vehicle through a bearing means when said pressure plates are engaged with said clutch plates rotating with the rotational shaft;

said bearing means comprising a first bearing having an inner ring and an outer ring and a second bearing having an inner ring and an outer ring; and said outer ring of said first bearing being fitted on said pressure plate while said inner ring of said first bearing is fitted on said casing, and said outer ring of said second bearing being fitted on said casing while said inner ring of said second bearing is fitted on said pressure plate.

16. A hydraulic retarder for a vehicle, comprising:

a casing fixed to vehicle body members and unrotatable with respect thereto;

an operational fluid filled within said casing;

stator means disposed in and secured to said casing;

rotor means disposed in said casing, said rotor means being rotatable with a rotational shaft of the vehicle;

clutch means disposed is said casing for rotating said rotor means;

plunger means slidably penetrating through said casing the fluid sealably;

drive means disposed outside said casing for engaging said clutch means through said plunger means;

a plurality of clutch plates connected to the rotational shaft of the vehicle and rotating therewith;

a plurality of pressure plates disposed alternately among said clutch plates, an end one of said pressure plates receiving a pressure of said plunger means;

a support member for supporting said pressure plates, said support member and said flange of said rotor vanes being formed as a unitary structure, said support member being rotatably supported on said casing;

said pressure plates and said support member of said clutch means rotating with respect to said casing with said rotational shaft of the vehicle through a bearing means when said pressure plates are engaged with said clutch plates rotating with the rotational shaft;

said bearing means comprising a first bearing having an inner ring and an outer ring and a second bearing having an inner ring and an outer ring; and said inner ring of said first bearing being fitted on said pressure plate while said outer ring of said first bearing is fitted on said casing, and said inner ring of said second bearing being fitted on said casing while said outer ring of said second bearing is fitted on said pressure plate.

* * * * *

UNITED STATES PATENT AND TRADEMARK OFFICE
CERTIFICATE OF CORRECTION

PATENT NO. : 5,285,872
DATED : February 15, 1994
INVENTOR(S) : Naoki Kaneda

It is certified that error appears in the above-indentified patent and that said Letters Patent is hereby corrected as shown below:

Claim 1, column 6, line 63, change "securing" to --secured--.

Claim 9, column 7, line 57, change "sad" to --said--.

Claim 15, column 8, line 16, change "is" to --in--.

Claim 15, column 8, line 33, after "and" insert --said--.

Claim 16, column 8, line 60, change "the" to --with--.

Claim 16, column 8, line 57, change "is" to --in--.

Signed and Sealed this

Twentieth Day of December, 1994

Attest:

BRUCE LEHMAN

*Attesting Officer*  *Commissioner of Patents and Trademarks*